United States Patent Office 2,847,467
Patented Aug. 12, 1958

2,847,467

PURIFICATION OF DODECANEDIOIC AND UNDECANEDIOIC ACIDS

Thomas R. Steadman, Waban, and John O. H. Peterson, Jr., Medford, Mass., assignors to National Research Corporation, Cambridge, Mass., a corporation of Massachusetts No Drawing. Application November 14, 1956
Serial No. 622,007

3 Claims. (Cl. 260—537)

This invention relates to the production of chemicals and in particular to the purification of acids.

A principal object of the present invention is to provide a method for the purification of the dicarboxylic acids, undecanedioic and dodecanedioic acids.

Other objects of the invention will in part be obvious and will in part appear hereinafter.

The invention accordingly comprises the process involving the several steps and the relation and order of one or more of such steps with respect to each of the others, which are exemplified in the following detailed disclosure, and the scope of the application of which will be indicated in the claims.

For a fuller understanding of the nature and objects of the invention reference should be had to the following detailed disclosure.

U. S. Patents 2,614,122 and 2,365,290 illustrate the preparation of long chain dicarboxylic acids such as undecanedioic and dodecanedioic acids by the oxidative cleavage of hydroxylated fatty materials. These acids are particularly useful in the preparation of polyesters or when esterified as plasticizers for vinyl compounds. In these reactions, however, there are also prepared lower monocarboxylic acids obtained from the other portion of the molecule being oxidized; thus for example, in the oxidative cleavage of 12-hydroxystearic acid as illustrated in the above United States patents or in the oxidative cleavage of 12-ketostearic acid or esters thereof as illustrated in copending applications Serial No. 549,874, filed November 29, 1955, and Serial No. 521,618, filed July 12, 1955, there is produced undecanedioic, dodecanedioic, caproic and enanthic acids. The relatively short chain monocarboxylic acids, such as caproic and enanthic may be effectively separated from the dicarboxylic acids by steam distillation. However, the stearic acid present in the starting material is not affected by the nitric acid and, being relatively involatile, is not removed by steam distillation and thus remains as an impurity in the dicarboxylic acid mixture. The present invention is directed to a novel process for purifying a mixture of dodecanedioic and undecanedioic acids by the removal of stearic acid therefrom.

The process of the present invention preferably comprises heating a solution containing aqueous acetic acid and a mixture of dodecanedioic and undecanedioic acids contaminated with stearic acid to a temperature on the order of the boiling point of the solution, removing the oily phase which separates during the heating, cooling the resultant clear, aqueous acetic acid phase, and recovering a high purity mixture of dodecanedioic and undecanedioic acids.

One specific detailed method of practicing the present invention is set forth in the following non-limiting example.

*Example I*

A mixture of 5190 grams (57.6 moles) of 70% nitric acid, 13 grams of powdered copper and 5.19 grams of ammonium vanadate was placed in the reaction vessel and heated to 78° C. Thereupon, 905 grams (2.45 moles) of molten commercial (85% pure) methyl 12-hydroxystearate (the remaining 15% being stearic acid) was added to the rapidly stirred reaction mixture at a temperature of 90–95° C. over a period of 50 minutes. During this time water at 60–65° C. was circulated in a jacket surrounding the reactor. The use of lower cooling water temperatures was avoided in fear of freezing organic materials on the interior surface of the reactor. The reaction mixture was kept at the reaction temperature for about 10 minutes after the addition of the methyl 12-hydroxystearate and then discharged to an open stainless steel vessel. The mixture was cooled to 15° C. with stirring and the precipitated material filtered off. By reslurrying the filter cake with water the precipitated acids were washed thoroughly, using a total of one liter of water in four portions. The wet filter cake was then melted and the aqueous phase which separated was discarded. The product at this point consisted of a mixture of enanthic, caproic and stearic acids with the dodecanedioic and undecanedioic acids and weighed 800 grams when thoroughly dried.

The above product was subjected to a distillation with steam superheated to 120°–125° C. to remove the volatile monobasic acids, enanthic and caproic. Temperatures much in excess of 125° C. for the superheated steam result in some decomposition of the mixture.

The residual non-volatile acids, stearic, undecanedioic and dodecanedioic acids were recrystallized from about a 30% aqueous acetic acid solution. Thus, the non-volatile acids from two oxidation experiments, weighing 935 grams (consisting of about 90% dicarboxylic acids and about 10% stearic acid), were dissolved in 1000 ml. of acetic acid and treated with 50 grams of decolorizing carbon, heated and then filtered. The filtrate was diluted with 2000 ml. of water and this mixture heated to the boiling point (100° C.). An insoluble black, oily layer or phase weighing 103 grams was separated from the hot solution. The resulting clear, aqueous acetic solution was cooled to 20° C. to precipitate or crystallize out the dicarboxylic acids. The mixture was filtered and the filter cake obtained was redissolved in 1000 ml. of acetic acid and this solution treated with 53 grams of decolorizing carbon, heated and filtered. The filtrate was diluted with 2000 ml. of water and this mixture heated to 100° C.; 24 grams of a black oily phase or layer which separated from the hot solution was removed. The resulting clear, aqueous acetic acid solution was cooled to 20° C. The white, crystalline mixture of undecanedioic and dodecanedioic acids which separated from the solution on cooling were recovered by filtration and thoroughly washed with water to remove any acetic acid.

The recovered acids, when dried, weighed 659 grams, corresponding to 70.5% of the non-volatile acids. This acid mixture had a neutralization equivalent of 114.0 or a purity of about 98%. 91 grams (9.7%) of the dicarboxylic acids were found to be retained by the decolorizing carbon. 127 grams (13.6%) of stearic acid were recovered from the oily phases which solidified on cooling. 14 grams (1.5%) of the dicarboxylic acids remained in the mother liquor.

Although only aqueous acetic acid solutions of about 30% are illustrated, it is also possible to utilize aqueous acetic acid solutions of somewhat lower or higher concentrations. Increasing the acetic acid concentration much above 30% increases the solubility of the stearic acid in the solution. Decreasing the acetic acid concentration much below 30% causes more of the dicarboxylic acids to go into the oily phase.

The stearic acid contaminated mixture of dodecanedioic and undecanedioic acids may be adequately purified by subjecting it to only one recrystallization with acetic acid. However, best results are achieved when the impure mixture is subjected to more than one recrystallization.

Since certain changes may be made in the above process without departing from the scope of the invention herein involved, it is intended that all matter contained in the above description shall be interpreted as illustrative and not in a limiting sense.

What is claimed is:

1. The process which comprises dissolving a mixture of dodecanedioic and undecanedioic acids contaminated with stearic acid in an aqueous solution of acetic acid, heating said solution to a temperature on the order of the boiling point of the solution, removing the oily phase which separates from the hot solution, cooling the resultant clear, aqueous acetic acid phase, and recovering a high purity mixture of dodecanedioic and undecanedioic acids.

2. The process which comprises dissolving a mixture of dodecanedioic and undecanedioic acids contaminated with stearic acid in an aqueous solution of acetic acid, heating said solution to a temperature on the order of the boiling point of the solution, recovering the oily phase which separates from the hot solution, cooling the resultant clear, aqueous acetic acid phase to cause crystallization of the acids dissolved therein, recovering the crystallized acids, dissolving said recovered acids in aqueous acetic acid, heating said solution to a temperature on the order of the boiling point of the solution, removing the oily phase which separates from the hot solution, cooling the resultant clear, aqueous acetic acid phase, and recovering a high purity mixture of dodecanedioic and undecanedioic acids.

3. The process which comprises dissolving a mixture of dodecanedioic and undecanedioic acids contaminated with stearic acid in about a 30% aqueous solution of acetic acid, heating said solution to a temperature on the order of 100° C., removing the oily phase which separates from the hot solution, cooling the resultant clear aqueous acetic acid phase, and recovering a high purity mixture of dodecanedioic and undecanedioic acids.

References Cited in the file of this patent

UNITED STATES PATENTS

| | | |
|---|---|---|
| 2,203,680 | Ellingboe | June 11, 1940 |
| 2,731,495 | Emslie | Jan. 17, 1956 |
| 2,777,865 | Logan | Jan. 15, 1957 |